United States Patent
Kumazawa et al.

(10) Patent No.: US 7,354,313 B2
(45) Date of Patent: Apr. 8, 2008

(54) PHOTOELECTRIC COMBINED CONNECTOR

(75) Inventors: Takeshi Kumazawa, Tokyo (JP);
Takeshi Yamazaki, Tokyo (JP);
Takumi Yoshida, Tokyo (JP)

(73) Assignee: Hirose Electric Co., Ltd., Tokyo (JP)

( * ) Notice: Subject to any disclaimer, the term of this patent is extended or adjusted under 35 U.S.C. 154(b) by 0 days.

(21) Appl. No.: 11/431,548

(22) Filed: May 11, 2006

(65) Prior Publication Data

US 2006/0270283 A1 Nov. 30, 2006

(30) Foreign Application Priority Data

May 24, 2005 (JP) ............................. 2005-151264

(51) Int. Cl.
*H01R 25/00* (2006.01)
(52) U.S. Cl. ..................................................... 439/638
(58) Field of Classification Search ................ 439/304, 439/135, 136, 142, 297, 607, 638, 699, 608–610, 439/668–669, 577; 385/88–94; 361/741, 361/683, 753, 732, 752, 799, 800
See application file for complete search history.

(56) References Cited

U.S. PATENT DOCUMENTS 4,678,264 A * 7/1987 Bowen et al. ................ 385/89
5,615,292 A * 3/1997 Beckwith ...................... 385/89
6,304,436 B1* 10/2001 Branch et al. .............. 361/683
2003/0076658 A1* 4/2003 Aronson et al. ............ 361/741

OTHER PUBLICATIONS

European Search Report Sep. 10, 2006.

* cited by examiner

*Primary Examiner*—Edwin A. León
(74) *Attorney, Agent, or Firm*—Kubotera & Associates, LLC

(57) ABSTRACT

A photoelectric combined connector includes a first connector and a second connector. The first connector includes a first housing and a first electrical terminal disposed in the first housing. The second connector includes a second housing, a board disposed in the second housing and having a photoelectric conversion unit, and a second electrical terminal disposed in the second housing. The second electrical terminal includes a fitted-in portion into which a part of the board is fitted when the board is attached to the second housing. When the first connector is connected to the second connector, the first electrical terminal of the first connector electrically contacts with the second electrical terminal of the second connector. Through the contact, the first electrical terminal of the first connector electrically contacts with the photoelectric conversion unit of the second connector.

15 Claims, 5 Drawing Sheets

PHOTOELECTRIC COMBINED CONNECTOR

BACKGROUND OF THE INVENTION AND RELATED ART STATEMENT

The present invention relates to a photoelectric combined connector, more specifically, a photoelectric combined connector including a board.

A conventional photoelectric combined connector 100 is shown in FIG. 5. The conventional photoelectric combined connector 100 is formed of a plug side connector 102 and a receptacle side connector 106. The plug side connector 102 includes a plug side housing 126; a plug side terminal 130 disposed in the plug side housing 126; and a block 134 detachably attached to the plug side connector 102. A plug side shell 128 is made of metal, and an end portion thereof is bent to form a block fixing portion 138 for fixing the block 134.

The receptacle side connector 106 includes a receptacle side housing 160; and a receptacle side terminal 170 disposed in the plug side housing 160.

An optical receiving and emitting element (not shown) is disposed in the block 134 for converting light received from an optical fiber 108 to a weak electrical signal. The electrical signal is sent to a wiring 132 disposed on a front surface of the block 134 for performing various processes. The optical receiving and emitting element also converts an electrical signal received through contact between the receptacle side terminal 170 and the plug side terminal 130, and contact between the plug side terminal 130 and the wiring 132 to light.

In the conventional photoelectric combined connector, a weak electrical signal generated in the optical receiving and emitting element is sent as is, i.e., not being amplified, to the receptacle side housing 106. Therefore, when transmitting a signal, noise may enter the electrical signal. To this end, it is necessary to provide an amplifier device such as an amp. In general, such an amplifier device is provided outside a connector as a separate component. In this case, a device tends to become large, thereby making it difficult to provide a low-profile connector.

In the conventional photoelectric combined connector, the block 134 is fixed in a state that the block fixing portion 138 presses the block 134 against the plug side terminal 130. As a result, contact between the wiring 132 of the block 134 and the plug side terminal 130 becomes unstable. Further, it is necessary to provide the block fixing portion 138, thereby increasing the number of components.

In view of the problems described above, an object of the present invention is to provide a low-profile connector with a small number of components capable of mounting a component such as an amplifier device.

Further objects will be apparent from the following description of the invention.

SUMMARY OF THE INVENTION

According to the present invention, a photoelectric combined connector includes a first connector and a second connector. The first connector includes a first housing and a first electrical terminal disposed in the first housing. The second connector includes a second housing, a board disposed in the second housing and having a photoelectric conversion unit, and a second electrical terminal disposed in the second housing. The second electrical terminal includes a fitted-in portion into which a part of the board is fitted when the board is attached to the second housing.

When the first connector is connected to the second connector, the first electrical terminal of the first connector electrically contacts with the second electrical terminal of the second connector. Through the contact, the first electrical terminal of the first connector electrically contacts with the photoelectric conversion unit of the second connector.

In the connector described above, the part of the board may be an edge portion of the board. Further, the board may be provided with an amplifier device electrical connected to the board and the photoelectric conversion unit and disposed between the board and the photoelectric conversion unit.

In the connector described above, the fitted-in portion of the second electrical terminal may be formed by extending a part of the second electrical terminal in a direction opposite to a direction that the board is fitted into the fitted-in portion.

In the connector described above, when the first connector is fitted into the second connector, the second electrical terminal may contact with the first electrical terminal at a side different from a side where the board is fitted into the second electrical terminal.

In the connector described above, the second electrical terminal may be formed in an E character shape. A center portion of three portions of the E character shape of the second electrical terminal extending in parallel may be used as a fixing portion for fixing the second electrical terminal to the second connector. Alternatively, upper two portions or lower two portions of the three portions of the E character shape of the second electrical terminal extending in parallel may be provided as the fitted-in portion.

In the connector described above, it is preferred that the first electrical terminal of the first connector electrically contacts with the second electrical terminal of the second connector at a position close to the fitted-in portion when the first connector is connected to the second connector.

In the connector described above, the second electrical terminal may be a bent terminal, and the bent terminal may constitute the fitted-in portion.

In the connector described above, the second electrical terminal may have a substantially U character shape. Inner portions of two portions of the U character shape extending in parallel may constitute the fitted-in portion, and outer portions thereof may constitute the fixing portion.

Further, the fitted-in portion may be formed between the second electrical terminal and the second housing.

According to the present invention, it is possible to provide a low-profile connector with a small number of components capable of mounting a component such as an amplifier device.

DETAILED DESCRIPTION OF THE PREFERRED EMBODIMENTS

Figure 1:
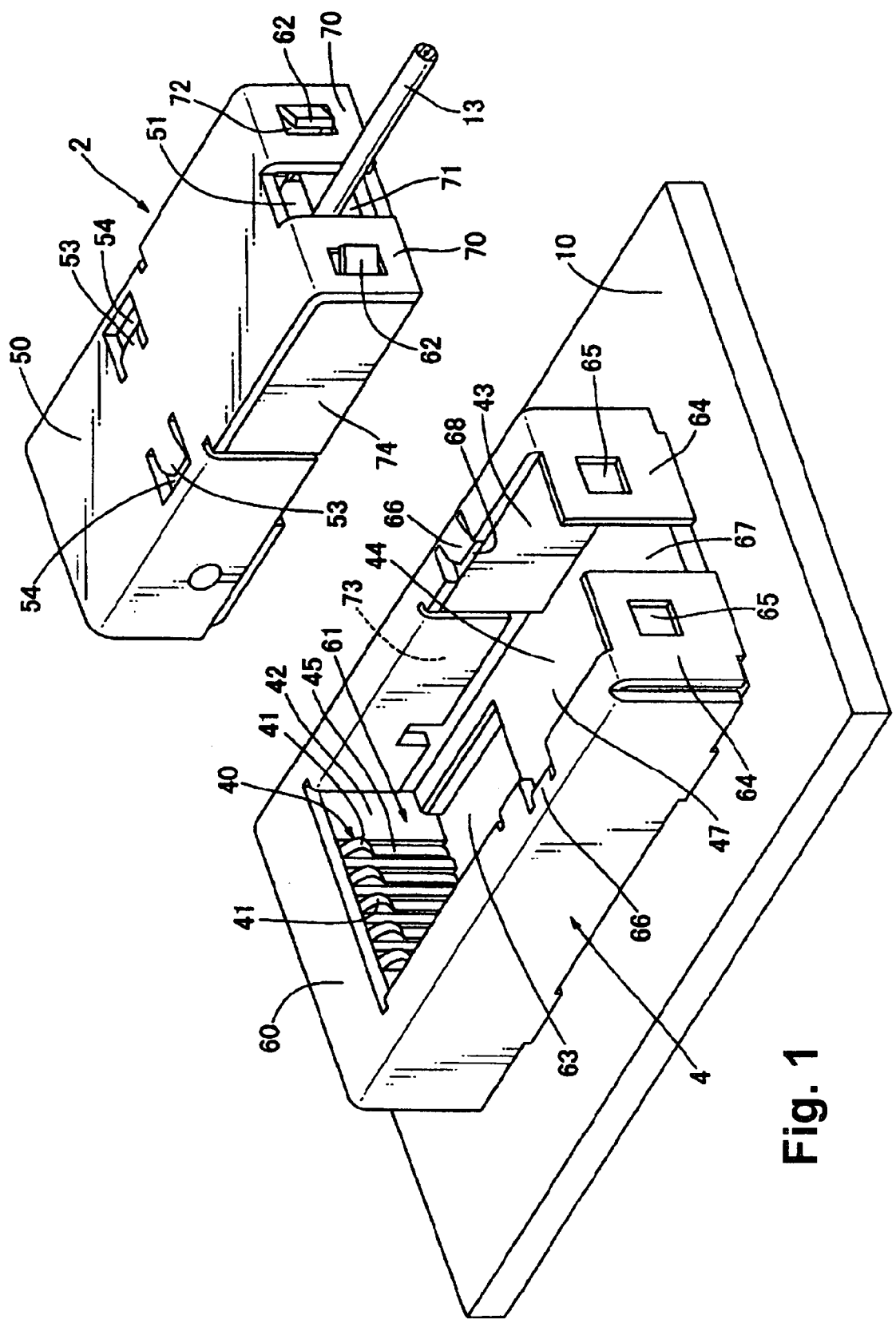
FIG. 1 is a perspective view showing a plug side connector and a receptacle side connector in a state before connection.

Hereunder, an embodiment of a photoelectric combined connector according to the present invention will be explained with reference to FIG. 1 to FIG. 3.

The connector photoelectric combined is formed of a plug side connector (photo-module side connector) 2 and a receptacle side connector 4. FIG. 1 is a perspective view showing the plug side connector 2 and the receptacle side connector 4 in a state before connection. FIG. 2 is a perspective view showing the plug side connector 2 and the receptacle side connector 4 in a state after connection. FIG. 3 is a sectional perspective view showing taken along a line 3-3 in FIG. 2.

The receptacle side connector 4 mainly includes a receptacle side housing 61; a receptacle side shell 60 covering the receptacle side housing 61; and connector terminals 40 disposed and fixed inside the receptacle side housing 61. The receptacle side connector 4 is mounted on, for example, a board 10 in use.

The receptacle side housing 61 includes a front portion 42; two sidewall portions 43; and a bottom portion 44 extending at a bottom surface except a portion close to a side of the front portion 42. A terminal fixing portion is provided in the front portion 42, and a plurality of the connector terminals 40 is arranged on the terminal fixing portion in parallel along a direction that the sidewall portions 43 extend.

The receptacle side shell 60 is formed through punching a single metal plate and bending the same. When the receptacle side shell 60 is attached to the receptacle side housing 61, the receptacle side shell 60 covers all of outer surfaces of the receptacle side housing 61 except a bottom side of the receptacle side connector 4 and portions 73 of inner surfaces of the sidewall portions 43.

Further, two bent portions 64 of the receptacle side shell 60 cover a rear surface of a rear portion 47. A pair of engaging pieces 66 is formed at rear portions of the receptacle side shell 60 by bending parts of the receptacle side shell 60 toward the receptacle side housing 61, so that the receptacle side shell 60 is fixed to the receptacle side housing 61. The engaging pieces 66 are inserted into engaging holes 68 of the receptacle side housing 61.

The receptacle side housing 61 and the receptacle side shell 60 constitute a fitted-in recess portion 63 for fitting the plug side connector 2 therein. The plug side connector 2 is fitted into the fitted-in recess portion 63 from above. The receptacle side connector 4 has a height necessary for the plug side connector 2 to be fitted into the fitted-in recess portion 63. When the plug side connector 2 is fitted into the fitted-in recess portion 63 of the receptacle side connector 4, the plug side connector 2 is completely fitted in the fitted-in recess portion 63. At this time, the connector has a substantially complete rectangular shape as a whole.

When the plug side connector 2 is fitted into the fitted-in recess portion 63, engaging protrusions 62 of the plug side connector 2 are snap-fitted into engaging holes 65 formed in the bent portions 64, respectively. As a result, the plug side connector 2 engages the receptacle side connector 4. A space 67 is provided between the bent portions 64, so that an optical fiber 13 extending outside the plug side connector 2 does not collide when the plug side connector 2 is fitted in.

The connector terminals 40 have a shape that two L character shapes are connected horizontally. Each of the connector terminals 40 includes three portions, i.e., a contact portion 45; a fixing portion 46; and a board placing portion 48. The fixing portion 46 is provided as a vertical portion, and is fitted into and fixed to a vertical hole 69 extending from a bottom side of the receptacle side housing 61 to a center thereof.

The board placing portion 48 is provided as a horizontal portion, and is fixed along a groove of the receptacle side housing 61 between the receptacle side housing 61 and the board 10. An end portion 49 of the board placing portion 48 is exposed outside after the board placing portion 48 is fixed. Although not clearly shown in Figures, a part of the board placing portion 48 is connected to a wire (not shown) on the board 10 for transmitting an electrical signal between the board placing portion 48 and the board 10.

The contact portion 45 is provided as a vertical portion similar to the fixing portion 46. When the plug side connector 2 and the receptacle side connector 4 are fitted together, the contact portion 45 contacts with a plug side terminal 30 provided on a side of the plug side connector 2 through a terminal contact 41 thereof. It is preferred that the terminal contact 41 is arranged to slightly protrude into the fitted-in recess portion 63, so that the terminal contact 41 efficiently contacts with the side of the plug side connector 2.

The plug side connector 2 mainly includes a plug side housing 51; a plug side shell 50 covering an outer portion of the plug side housing 51; the plug side connector terminals 30 disposed and fixed inside the plug side housing 51; and a photo-module board 12. As described later, it is possible to mount various parts on the board 12. In the present invention, parts are mounted on the board 12 and retained in the connector, so that the connector has a low-profile structure.

A plurality of plug side terminals 30 is arranged in parallel in a front portion 56 of the plug side housing 51 at a position corresponding to the connector terminals 40 of the receptacle side connector 4. It is possible to fit and fix the plug side terminals 30 along a direction that the plug side housing 51 extends from a front surface of the front portion 56 of the plug side housing 51. On the other hand, it is possible to fit and fix the board 12 and the parts mounted thereon along a direction that the plug side housing 51 extends from a rear surface of a rear portion 58, i.e., the direction opposite to the direction that the plug side terminals 30 are fitted in. The board 12 and the parts mounted thereon are arranged from a middle portion 57 of the plug side housing 51 to the rear portion 58.

The plug side shell 50 is formed through punching a single metal plate and bending the same. When the plug side shell 50 is attached to the plug side housing 51, the plug side shell 50 covers all of outer surfaces of the plug side housing 51 except a bottom side of the plug side housing 51 and left and right side surfaces 74 at a rear side. A space 71 is provided in a rear surface of the rear portion 58 of the plug side housing 51 at the middle of bent portions 70, so that the optical fiber 13 does not collide when the plug side shell 50 is attached to the plug side housing 51. Holes 72 are formed in the bent portions 70 at the middle thereof, so that the engaging protrusions 62 protrude outside therethrough.

A pair of engaging pieces 53 is formed at upper middle portions of the plug side shell 50 by bending parts of the plug side shell 50 toward the plug side housing 51, so that the plug side shell 50 is fixed to the plug side housing 51. The engaging pieces 53 are inserted into engaging holes 54 of the plug side housing 51.

The plug side terminals 30 have a substantially E character shape as a whole. Each of the plug side terminals 30 mainly includes a contact portion 35; a fixing portion 36; a middle extending portion 37; and a bottom extending portion 38. The contact portion 35 is provided as a vertical base portion, and other portions 36, 37, and 38 are arranged to extend horizontally in parallel from the contact portion 35.

The fixing portion 36 is provided for fixing the plug side terminal 30 to the plug side housing 51. The extending portions 37 and 38 constitute a fitted-in portion into which a part of the board 12 is fitted. When the board 12 is fitted into the plug side housing 51 from the rear surface of the rear portion 58, a part of the board 12, for example, an end portion of the board 12 including on-board wirings 17(a) to 17(e) on a board surface, is fitted into each of the fitted-in portions constituted by the expending portions 37 and 38. Accordingly, it is possible to securely and easily contact the on-board wirings 17(a) to 17(e) and board contacts 31 formed at ends of the extending portions 37 electrically and physically.

In order to secure the fitting, the extending portions 37 and 38 extend in the direction opposite to the direction that the board 12 is fitted into the fitted-in portions. With the fitted-in portions constituted by the extending portions 37 and 38, the on-board wirings 17(a) to 17(e) contact with the plug side terminals 30 at specific contact positions, and are fixed at the positions, thereby greatly reducing noise. In the present invention, it is arranged such that the board 12 is sandwiched with the extending portions 37 and 38 to maintain the contacted state. Accordingly, it is not necessary to provide a separate component for maintaining the contacted state between the board 12 and the plug side terminals 30.

It is possible to mount various components on the board 12, and the components are not limited to specific ones. For example, the components include a base 15 for fixing an optical fiber; a fixing plate 16; a photo-conversion unit 20; a wiring 22; an amplifier 18; and the on-board wirings 17(a) to 17(e). The base 15 is disposed on the board 12 at the rear portion 58 of the plug side housing 51 for positioning and placing a distal end of the optical fiber 13 and a fiber wire 14 of the optical fiber 13 along an upper groove. The fixing plate 16 is disposed on the base 15 for covering and fixing a part of the optical fiber 13 to the base.

The photo-conversion unit 20 is disposed on the base 15 at a position close to a distal end of the fiber wire 14 for receiving an optical signal from the fiber wire 14 and converting the light signal to an electrical signal, or receiving an electrical signal and converting the electrical signal to an optical signal. The wiring 22 transmits the electrical signal from the photo-conversion unit 20 to the amplifier 18 on the board 12. The amplifier 18 is disposed on the board 12 for amplifying a weak current obtained from the photo-conversion unit 20.

The on-board wirings 17(a) to 17(e) are disposed on the board 12 for transmitting the electrical signal sent from the photo-conversion unit 20 and amplified at the amplifier 18 to the plug side terminals 30. The on-board wirings 17(a) to 17(e) may include a plus side wiring 17a; a minus side wiring 17b; a GND wiring 17c; a wiring 17d for driving the amplifier; and other wiring 17e.

The photo-conversion unit 20 may include VCSEL (Vertical Cavity Surface Emitting Laser); flip-chip; ROSA; TOSA; LD; and PD. The photo-conversion unit 20 generates only a weak current. However, since the amplifier 18 is disposed between the photo-conversion unit 20 and the board contacts 31 (fitted-in portion) in a state close to the photo-conversion unit 20, it is possible to prevent noise from entering the current generated at the photo-conversion unit 20 when the current is transmitted to the plug side terminals 30.

Apparently, when the plug side connector 2 is connected to the receptacle side connector 4, the plug side terminals 30 of the plug side connector 2 electrically contact with the connector terminals 40 of the receptacle side connector 4 at the terminal contacts 41 of the connector terminals 40, i.e., on the side opposite to the side where the board 12 is fitted in, for example, an opposite side. Through the contact, the connector terminals 40 of the receptacle side connector 4 electrically contact with the photo-conversion unit 20 of the plug side connector 2. Through these connections, it is possible to transmit an electrical signal between the plug side connector 2 and the receptacle side connector 4 while performing photo-electric conversion.

Figure 2:
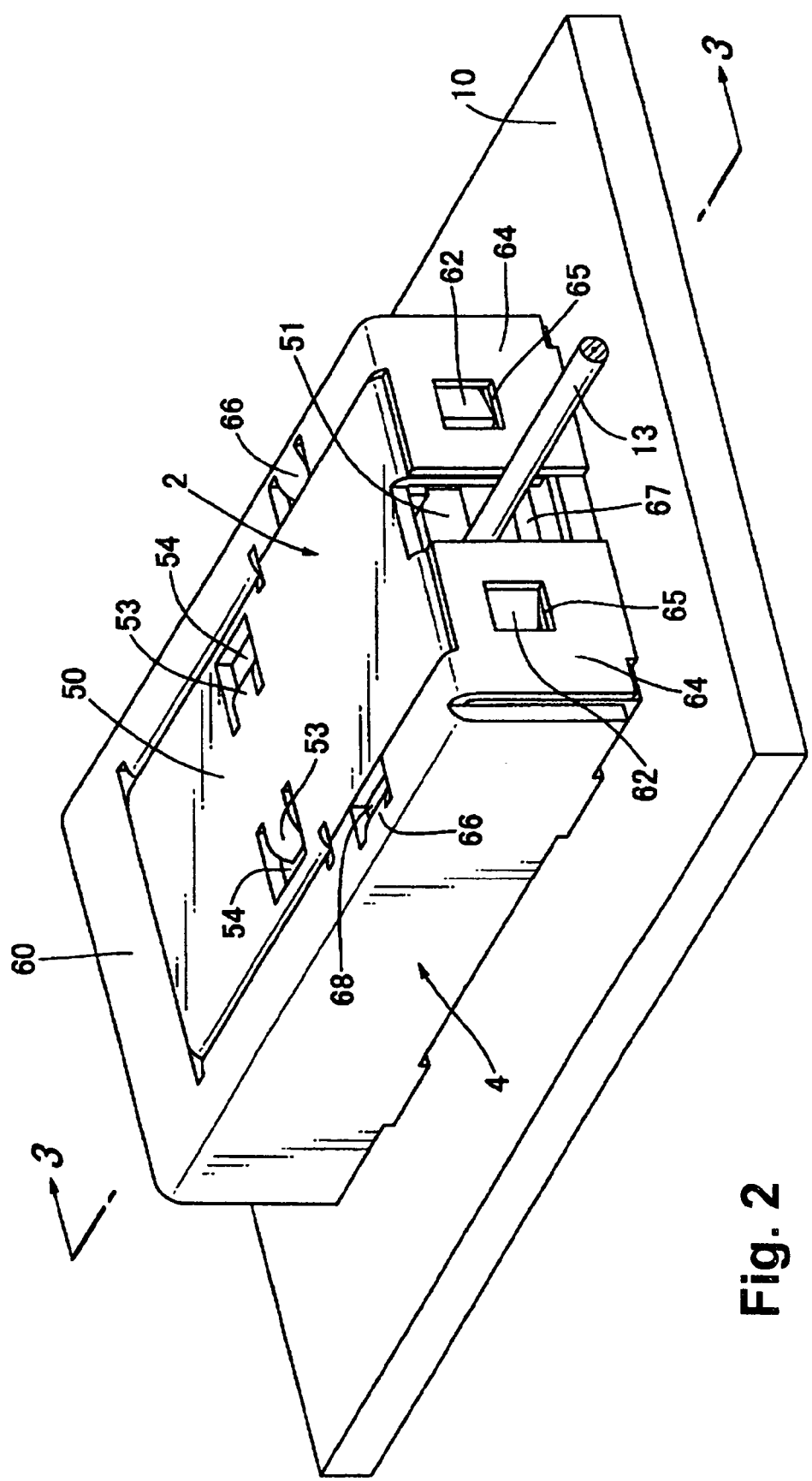
FIG. 2 is a perspective view showing the plug side connector and the receptacle side connector in a state after connection.
Figure 3:
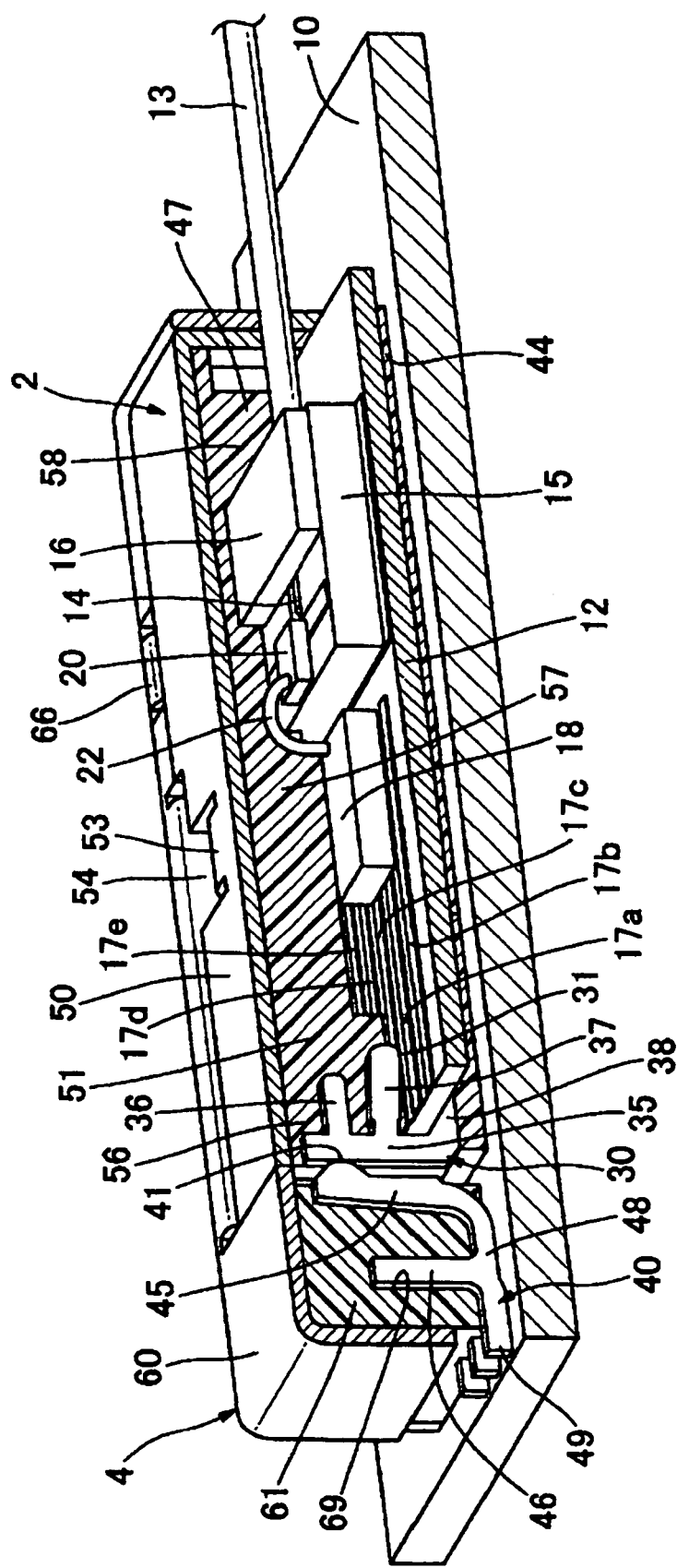
FIG. 3 is a sectional perspective view showing taken along a line 3-3 in FIG. 2.

FIGS. 4(a) to 4(d) are views showing modified examples of the plug side connector according to the embodiment shown in FIG. 1 to FIG. 3. FIGS. 4(a) to 4(d) are enlarged views showing plug side terminals and surrounding components thereof. Components same as those in FIG. 1 to FIG. 3 are designated by same reference numerals.

Figure 4:
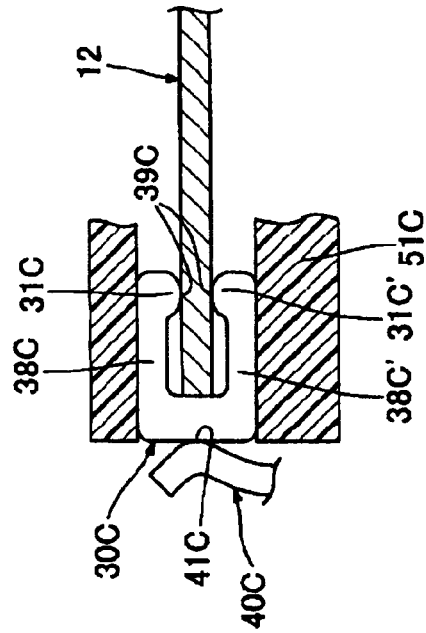
FIGS. 4(a) to 4(d) are views showing modified examples of the plug side connector.
Figure 4:
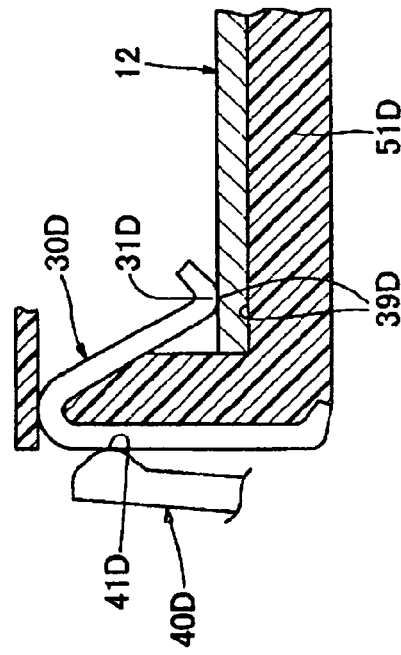
Figure 4:
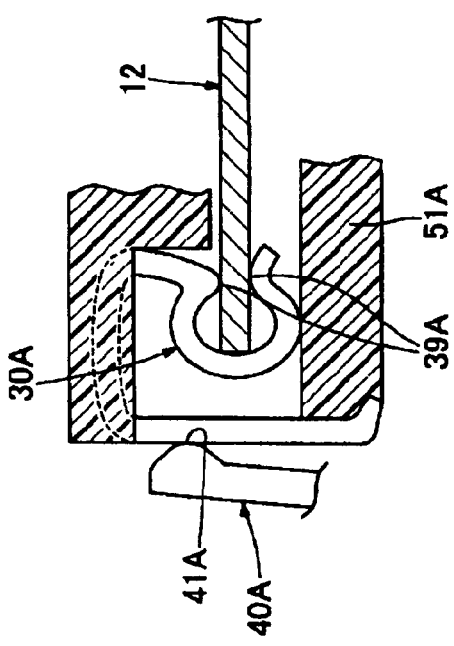
Figure 4:
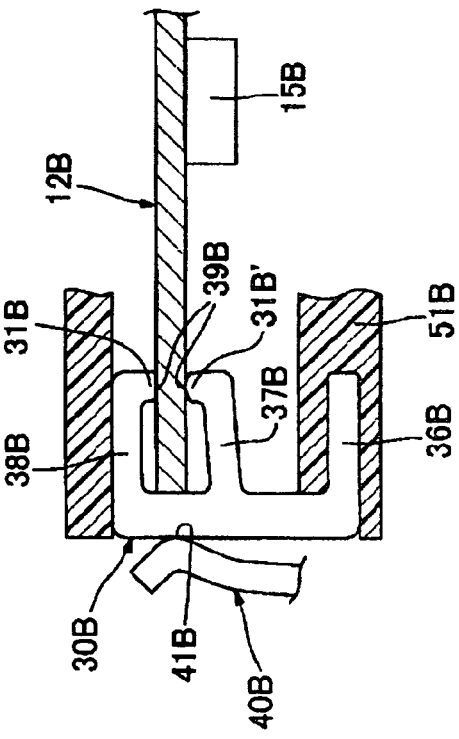
Figure 5:
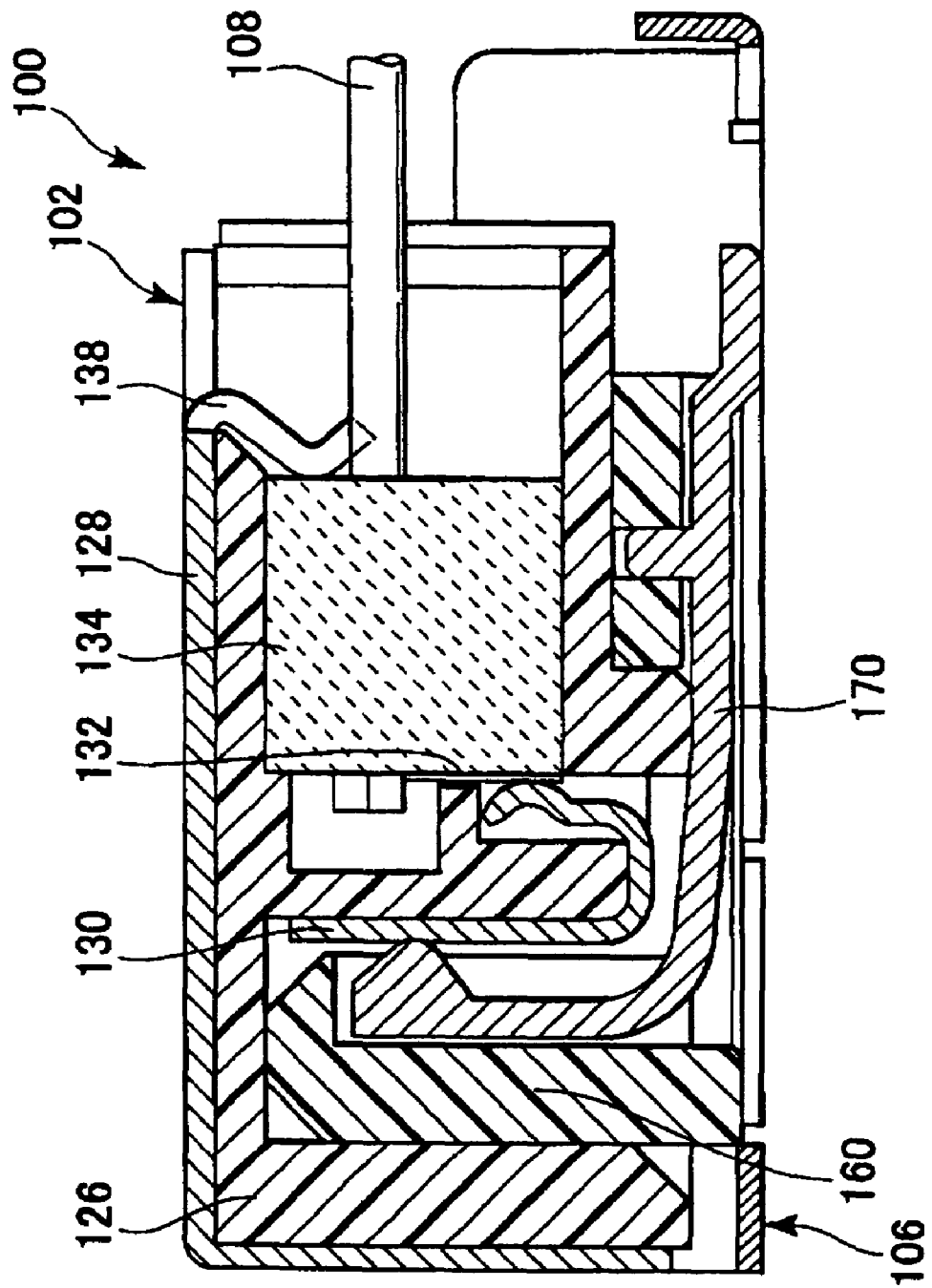
FIG. 5 is a view showing an example of a conventional photoelectric combined connector.

FIG. 4(a) shows an example in which a bent terminal 30A is used as a plug side terminal instead of that shown in FIG. 1. With the bent terminal 30A, it is possible to easily form various contact structures. As shown in FIG. 4(a), the terminal bent in an L character shape is reversed, and an end thereof is bent in a C character shape, so that the bent terminal 30A is formed as the C character shape portion with a narrow width into which the board 12 is fitted. The bent terminal may have various shapes for receiving the board 12 other than the example shown in FIG. 4(a).

FIG. 4(b) shows an example using a terminal with a substantially E character shape similar to FIG. 1 to FIG. 3. In this case, a portion used as a fixing portion 36B and a portion used as an extending portion 38B forming a fitted-in portion are reversed vertically relative to the example shown in FIG. 1. Further, a portion except a middle portion of three portions of the E shaped electrical terminal extending in parallel, especially a lower extending portion 36B, is used as a fixing portion for fixing to a plug side connector housing 51B. (In the embodiment shown in FIG. 1 to FIG. 3, the upper portion 36 is used as the fixing portion.)

Two upper portions of the three portions of the E shaped electrical terminal extending in parallel, i.e., the extending portions 37B and 38B, constitute a fitted-in portion. Since the plug side terminal 30 is reversed, a board 12B is also turned up side down. When wiring portions are disposed on both of upper and lower surfaces of the board 12B, or a wiring portion is disposed on a lower surface of the board 12B, it is not necessary to reverse the board 12B.

In the embodiment, similar to the embodiment shown in FIG. 1, it is possible to achieve low-profile mounting and space reduction. Further, it is possible to arrange a contact 41B between the plug side terminal 30B and the connector terminal 40 close to contacts 31B and 31B' between the plug side terminal 30B and the board 12B. In other words, it is possible to arrange the contact 41B close to a fitted-in portion 39B, thereby making it possible to stabilize the contacted state.

FIG. 4(c) shows a plug side terminal functioning as both the fitted-in portion and the fixing portion. In a plug side terminal 30C, the same terminal functions as the fitted-in portion 36 and the extending portion 37 of the plug side terminal 30 shown in FIG. 1. The plug side terminal 30C has a substantially U character shape as a whole. Two portions of the U shaped portion extending in parallel, i.e., outer portions of fixing fitted-in terminal 38C and 38C', are used as a fixing portion for fixing to a plug side connector housing 51C.

Further, the plug side terminal 30C and board contacts 31C and 31C' at inside thereof are used as the fitted-in portion into which the board 12 is fitted. This structure may be inferior to the embodiment shown in FIG. 1 in terms of fixing. However, it is possible to provide better effect in reducing a height as compared with the embodiment shown in FIG. 1.

FIG. 4(d) shows a plug side terminal in which the board is fitted into between the terminal and the housing. A fitted-in portion 39D is formed between a board contact 31D of a plug side terminal 30D and an upper surface of a plug side connector housing 51D, so that the board 12 is fitted therein. In the embodiment, it is possible to reduce a height of the board on which components are mounted in a larger extent than the embodiment shown in FIG. 1.

As described above, according to the embodiments of the present invention, it is possible to provide the low-profile connector. The structure is applicable to various types of photo-electrical combined connectors.

The disclosure of Japanese Patent Application No. 2005-151264, filed on May 24, 2005, is incorporated in the application.

While the invention has been explained with reference to the specific embodiments of the invention, the explanation is illustrative and the invention is limited only by the appended claims.

What is claimed is:

1. A photoelectric combined connector comprising:
   a first connector including a first housing attached to a board and a first electrical terminal disposed in the first housing, said first housing including an upper receptacle opening on an upper side thereof opposite to the board; and
   a second connector including a second housing, a second electrical terminal disposed in the second housing, and a photo-module board having a photoelectric conversion unit, said second electrical terminal including a fitted-in portion for receiving the photo-module board so that the first electrical terminal electrically contacts with the second electrical terminal and the photoelectric conversion unit when the second connector is fitted into the first connector through the upper receptacle opening from above,
   wherein said upper receptacle opening opens in a direction of an axis perpendicular to a plane of the board.

2. The photoelectric combined connector according to claim 1, wherein said fitted-in portion receives an end portion of the photo-module board.

3. The photoelectric combined connector according to claim 1, further comprising an amplifier device disposed on the photo-module board and electrically connected to the photoelectric conversion unit.

4. The photoelectric combined connector according to claim 1, wherein said fitted-in portion includes an extending portion extending in a first direction opposite to a second direction that the photo-module board is fitted into the fitted-in portion.

5. The photoelectric combined connector according to claim 1, wherein said second electrical terminal further includes a bent terminal portion, said fitted-in portion being formed at the bent terminal portion.

6. The photoelectric combined connector according to claim 1, wherein said fitted-in portion is situated between the second electrical terminal and the second housing.

7. The photoelectric combined connector according to claim 1, wherein said second electrical terminal further includes a contact portion electrically contacting with the first electrical terminal, said contact portion disposed on a first side of the second electrical terminal opposite to a second side where the fitted-in portion is disposed.

8. The photoelectric combined connector according to claim 7, wherein said contact portion is arranged at a position close to the fitted-in portion.

9. The photoelectric combined connector according to claim 1, wherein said second electrical terminal has a substantially E character shape having an upper portion, a middle portion, and a lower portion extending in parallel, respectively.

10. The photoelectric combined connector according to claim 9, wherein at least one of said upper portion and said lower portion is fixed to the second connector as a fixing portion.

11. The photoelectric combined connector according to claim 9, wherein said photo-module board is fitted into at least one of a first space between the upper portion and the middle portion and a second space between the middle portion and the lower portion.

12. The photoelectric combined connector according to claim 1, wherein said second electrical terminal has a substantially U character shape having an upper portion and a lower portion extending in parallel, respectively, at least one of said upper portion and said lower portion being fixed to the second connector as a fixing portion.

13. The photoelectric combined connector according to claim 12, wherein said photo-module board is fitted into a third space between the upper portion and the lower portion.

14. The photoelectric combined connector according to claim 1, wherein said photoelectric conversion unit includes a cable connected thereto.

15. The photoelectric combined connector according to claim 14, wherein said first housing further includes a cable receptacle space for receiving the cable so that the cable is inserted into the cable receptacle space from above when the second connector is fitted into the first connector through the upper receptacle opening from above.

* * * * *